(12) United States Patent
Yang

(10) Patent No.: US 6,401,309 B1
(45) Date of Patent: Jun. 11, 2002

(54) FASTENING HOOK FOR ELASTIC ROPE

(75) Inventor: Ming-Shun Yang, Taipei (TW)

(73) Assignee: Formosa Saint Jose CORP., Taipei (TW)

( * ) Notice: Subject to any disclaimer, the term of this patent is extended or adjusted under 35 U.S.C. 154(b) by 0 days.

(21) Appl. No.: 09/789,659

(22) Filed: Feb. 22, 2001

(51) Int. Cl.⁷ .................... A44B 21/00; F16B 45/00
(52) U.S. Cl. .............. 24/130; 24/265 H; 24/129 R; 24/115 H; 24/115 R
(58) Field of Search .................. 24/129 R, 130, 24/115 H, 115 K, 115 R, 265 H, 136 R, 132 R; D8/367

(56) References Cited

U.S. PATENT DOCUMENTS

| | | | |
|---|---|---|---|
| 4,432,121 A | * 2/1984 | Dupre | 24/343 |
| 4,622,724 A | * 11/1986 | Dupre | 24/130 |
| 4,785,509 A | * 11/1988 | Fisher | 294/82.1 |
| D307,705 S | * 5/1990 | Mair | D8/367 |
| 5,033,169 A | * 7/1991 | Bindon | 24/129 R |
| 5,136,756 A | * 8/1992 | Krauss | 24/265 H |
| 5,283,930 A | * 2/1994 | Krauss | 24/129 R |
| 5,596,791 A | * 1/1997 | Parsons | 24/130 |
| 5,669,119 A | * 9/1997 | Seron | 24/265 H |

* cited by examiner

Primary Examiner—Robert J. Sandy
(74) Attorney, Agent, or Firm—Erik M. Arnhem

(57) ABSTRACT

A fastening hook for connecting to an elastic rope and adjusting an overall length of the elastic rope is provided. The fastening hook includes a front body portion and a rear hook portion. The body portion is sequentially provided from a right side to a left side with a right through hole, a right rope recess having a length of narrowed groove, a right turnaround hole, a narrowed bottom groove, a left turnaround hole, a left rope recess having a length of narrowed groove, and a left through hole having a top slit. Upright pointed projections are provided in all the narrowed grooves. When an end of elastic rope is sequentially extended through the right through hole, the right rope recess, the right turnaround hole, the narrowed bottom groove, the left turnaround hole, the left rope recess, and the left through hole for a desired section of the elastic rope to locate in the narrowed grooves and be pierced by the upright pointed projections, the elastic rope may be adjusted to a desired length and firmly connected at two ends to the fastening hooks.

3 Claims, 2 Drawing Sheets

FASTENING HOOK FOR ELASTIC ROPE

BACKGROUND OF THE INVENTION

The present invention relates to a fastening hook for connecting to an elastic rope, so that the elastic rope is securely connected to the fastening hook while an overall length of the elastic rope is adjustable through the fastening hook.

The elastic rope, due to its elasticity and extensible nature, is widely used to bind and fix an article to some position, for example, on a rack of a bicycle, a motorcycle or a roof of a car.

When using, the elastic rope to bind something to a fixed position on a rack, two fastening hooks connected to two ends of the elastic rope are used to firmly connect two ends of the elastic rope to fixed posts on the rack.

The fastening hooks can be divided into two types according to the manner of connection of the fastening hooks to the elastic rope. One of the two types of the fastening hooks is fixed fastening hook that is usually fixedly connected to an end of the elastic rope. by means of stamping or the like, and the other is adjustable fastening hook that is usually movably connected to an end of the elastic rope, so that an overall length of the elastic rope may be adjusted while connecting the rope end to the fastening hook. An advantage of the fixed fastening hook is a firm connection of the elastic rope to the fastening hook is ensured. On the other hand, the fixed fastening hook has a disadvantage of being useless in adjusting the length of the elastic rope. Thus, there are times the elastic rope has a fixed length and could not be extended or shortened to elastically fitly and firmly bind an article to the rack. In the conventional adjustable fastening hook, it enables an elastic rope to adjust the length thereof simply by extending a free end of the elastic rope through a buckle or the like provided at one end of the fastening hook. It is possible the buckle does not securely hold the elastic rope thereto to ensure a firm connection of the elastic rope to the fastening hook. And, it is possible the elastic rope separates from the fastening hook when the rope is overly tensioned.

It is therefore desirable to develop a fastening hook for connecting to an elastic rope to enable adjustment of an overall length of the elastic rope at any time and ensure a firm connection of the elastic rope to a front body portion of the fastening hook.

SUMMARY OF THE INVENTION

A primary object of the present invention is to provide a fastening hook for connecting to an elastic rope. The fastening hook has a structure that enables adjustment of an overall length of the elastic rope at any time and ensures a firm connection of the elastic rope to a front body portion of the fastening hook. To achieve the above and other objects, the fastening hook according to the present invention mainly includes a front body portion and a rear hook portion outward extended from a rear side of the front body portion. The body portion is provided at a top with a right rope recess and a left rope recess disposed side by side; at a front wall with a closed right through hole and a left hole having a top slit to aligh with the right and the left rope recesses, respectively; at rear ends of the right and the left rope recesses with right and left turnaround holes, respectively; at a lower portion of a partition wall between the right and the left turnaround holes with a narrowed bottom groove across the partition wall; in the right and the left rope recesses with a narrowed right groove and a narrowed left groove, respectively; and in every one of the narrowed right, left and bottom grooves with at least one upright pointed projection. When a free end of the elastic rope is sequentially extended through the right through hole, the right rope recess, the narrowed right groove, the right turnaround hole, the narrowed bottom groove, the left turnaround hole, the narrowed left groove, the left rope recess, and the left through hole to come out of the front body portion of the fastening hook with desired portions of the elastic rope deeply squeezed into the narrowed right, bottom and left grooves and pierced by the upright pointed projections, the elastic rope is adjusted to a desired length and securely connected to the body portion of the fastening hook. And, the through holes, the narrowed grooves, the turnaround holes, and the pointed projections on the fastening hook together ensure a firm connection of the elastic rope to the fastening hook without the risk of separating from each other even the elastic rope is under a strong pull.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
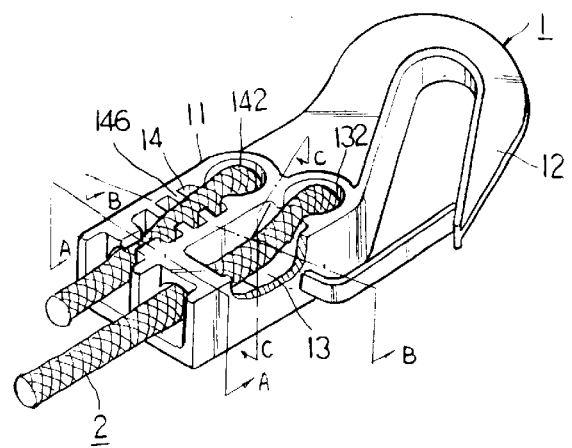
FIG. 1 is a perspective showing a fastening hook of the present invention is connected to an elastic rope.
Figure 4:
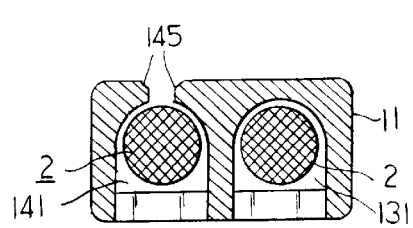
FIG. 4 is a sectional view taken on line A—A of FIG. 1.
Figure 5:
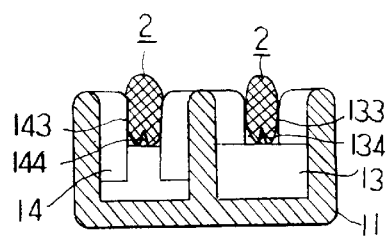
FIG. 5 is a sectional view taken on line B—B of FIG. 1.
Figure 6:
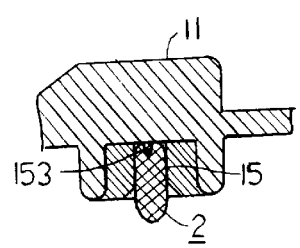
FIG. 6 is a sectional view taken on line C—C of FIG. 1.
Figure 2:
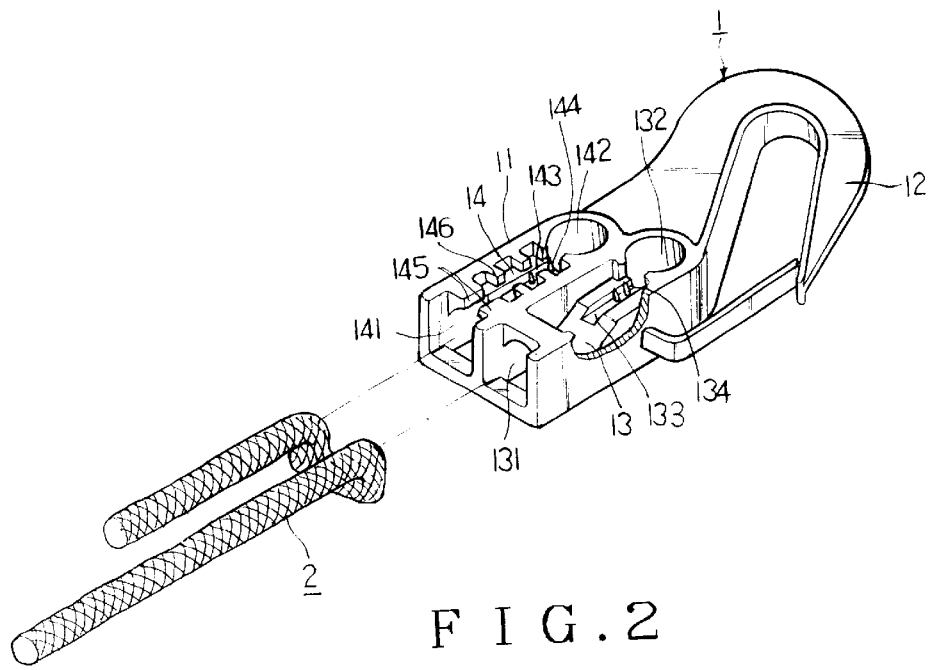
FIG. 2 is an exploded perspective of FIG. 1.
Figure 3:
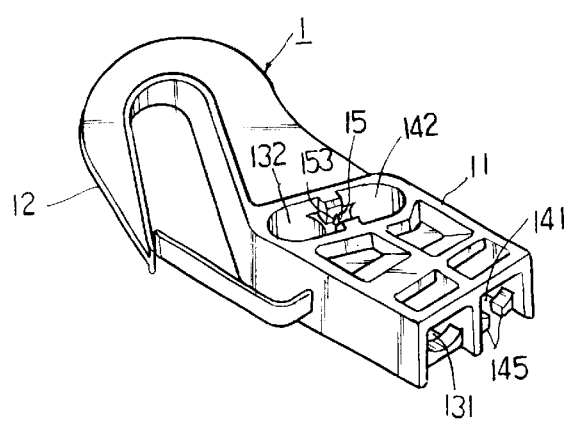
FIG. 3 is a perspective bottom view of the fastening hook of the present invention.

Please refer to FIGS. 1, 2 and 3 in which a fastening hook (1) for connecting to an elastic rope (2) is shown. The fastening hook (1) mainly includes a front body portion (11) and a rear hook portion (12) outward extended from a rear side of the body portion (1).

As shown in FIGS. 1 through 6, the body portion (11) of the fastening hook (1) is provided at a top with a right rope recess (13) and a left rope recess (14) disposed side by side. A right through hole (131) is formed on a front wall of the body portion (11) to align with the right rope recess (13). And, a left through hole (141) having a top slit is formed on the front wall of the body portion (11) to align with the left rope recess (14), so that two spaced projections (145) are located at two sides of the top slit of the left through hole (141) to face each other. A right and a left turnaround hole (132), (142) are formed at rear ends of the right and the left rope recesses (13), (14), respectively. A narrowed bottom groove (15) is provided to cross a lower portion of a partition wall between the right and the left turnaround holes (132), (142). A narrowed right groove (133) and a narrowed left groove (143) are further formed in the right and the left rope recesses (13), (14), respectively. The narrowed grooves (133), (143) and (15) are provided therein with at least one upright pointed projection (134), (144) and (153), respectively.

To connect the fastening hook (1) to the elastic rope (2), first extend a free end of the elastic rope (2) into the right through hole (131) on the front body portion (11) of the fastening hook (1), and then guide the free end of the elastic rope (2) to sequentially pass through the right rope recess (13), the narrowed right groove (133) in the recess (13), the right turnaround hole (132), the narrowed bottom groove (15), the left turnaround hole (142), the narrowed left groove (143) in the left rope recess (14), the left rope recess (14), and the left through hole (141) to come out of the front body portion (11) of the fastening hook (1). Allow desired portions of the elastic rope (2) to pass and be deeply squeezed into the narrowed grooves (133), (143) and (15), so that the upright pointed projections (134), (144) and (153) in these narrowed grooves pierce into the elastic rope (2) at these portions. The elastic rope (2) having been extended the through holes, squeezed into the narrowed grooves, turned around at the turnaround holes, and pierced by the pointed projections provided in the fastening hook (1) is firmly connected to the fastening hook (1) without the risk of separating from the fastening hook (1) when the elastic rope (2) is pulled to a fully tensed condition. Moreover, by selecting a desired section of the elastic rope (2) to connect to the body portion (11) of the fastening hook (1), an adjustment of an overall length of the elastic rope (2) is possible to facilitate binding of an article with the elastic rope (2) at a suitable pressure.

In addition, to enable the elastic rope.(2) to more securely connect to the fastening hook (1) of the present invention, a plurality of teeth (146) are oppositely provided at two sides of the right rope recess (13) and of the left rope recess (14) (in the illustrated embodiment, only the left rope recess (14) is provided with the teeth (146) ). The elastic rope (2) passing the rope recesses (13), (14) is further elastically squeezed between the, teeth (146) provided at two opposite sides of the recesses (13), (14) and is therefore more firmly connected to the fastening hook (1).

In conclusion, the fastening hook (1) of the present invention allows an elastic rope (2) to firmly connect thereto while an overall length of the elastic rope (2) can be adjusted through the fastening hook (1). The fastening hook for elastic rope according to the present invention is therefore novel in structure and practical for use.

What is claimed is:

1. A fastening hook for elastic rope, comprising a front body portion and a rear hook portion outward extended from a rear side of said front body portion; said body portion being provided at a top with a right rope recess and a left rope recess disposed side by side, at a front wall with a right through hole and a left through hole having a top slit to align with said right and said left rope recesses, respectively, at rear ends of said right and said left rope recesses with right and left turnaround holes, respectively, at a lower portion of a partition wall between said right and said left turnaround holes with a narrowed bottom groove across said partition wall, in said right and said left rope recesses with a narrowed right groove and a narrowed left groove, respectively, and in every one of said narrowed right, left and bottom grooves with at least one upright pointed projection; whereby when a free end of said elastic rope is sequentially extended through said right through hole, said right rope recess, said narrowed right groove, said right turnaround hole, said narrowed bottom groove, said left turnaround hole, said narrowed left groove, said left rope recess, and said left through hole for selected portions of said elastic rope to separately pass and be deeply squeezed into said narrowed right, bottom and left grooves and be pierced by said upright pointed projections, said elastic rope is length adjustably and securely connected to said body portion of said fastening hook.

2. A fastening hook for elastic rope as claimed in claim 1, wherein said left through hole has two spaced projections extended from two sides of said top slit toward each other.

3. A fastening hook for elastic rope as claimed in claim 1, wherein said right and said left rope recesses are provided at two opposite sides with a plurality of opposite teeth.

* * * * *